S. Harman,

Stump Extractor.

No. 109,316.  Patented Nov. 15, 1870.

WITNESSES:
J. W. Munday
J. B. Crane

INVENTOR:
Sam'l Harman
by Lewis L. Coburn
att'y

United States Patent Office.

SAMUEL HARMAN, OF LA PORTE, INDIANA.

Letters Patent No. 109,316, dated November 15, 1870.

IMPROVEMENT IN STUMP-EXTRACTORS.

The Schedule referred to in these Letters Patent and making part of the same.

I, SAMUEL HARMAN, of La Porte, in the county of La Porte and State of Indiana, have invented certain Improvements in Grub-Extractors, of which the following is a specification.

My invention relates to a portable grubber, of novel construction, for the purpose of pulling grubs, in clearing timbered land, and for other purposes; and It consists in a combination and arrangement of parts more explicitly hereinafter set forth.

In the accompanying drawing which, together with the letters and figures of reference marked thereon, forms part of this specification—

Figure 1:
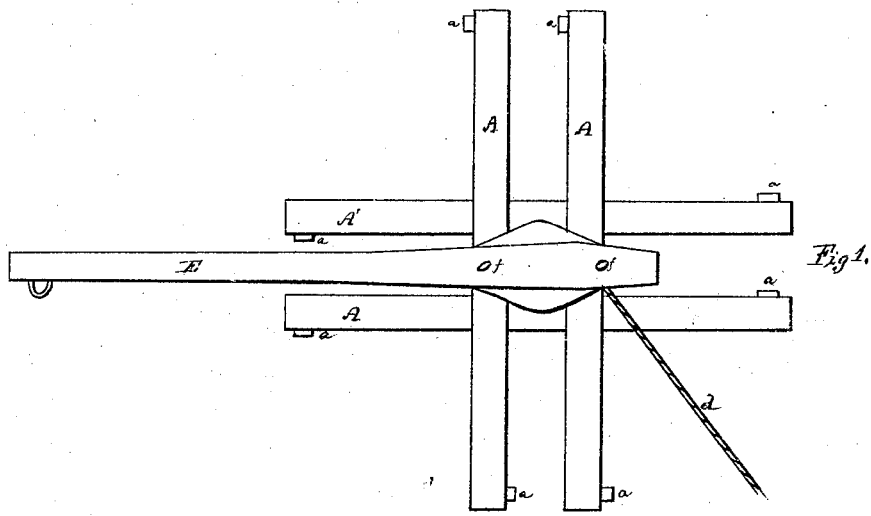

Figure 1 exhibits a plan or top view of my invention.

Figure 2:
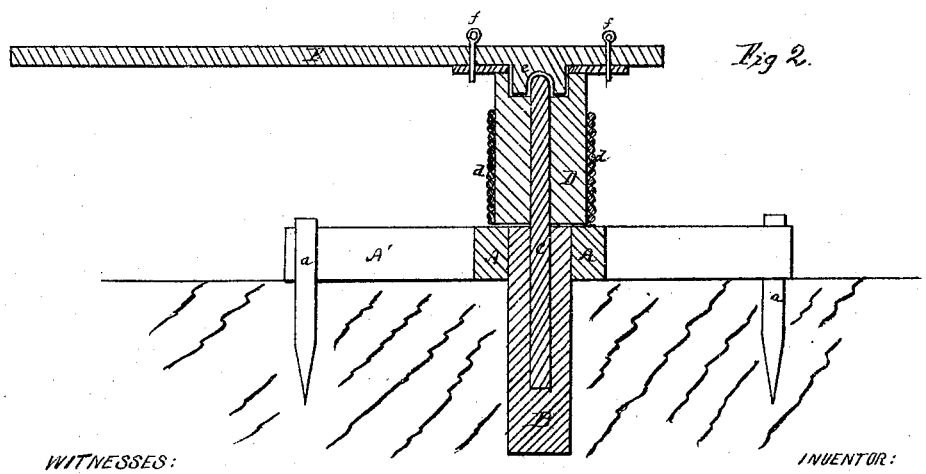

Figure 2 is a central vertical section of same.

General Description.

A A A' A' are four sleepers or beams, mortised to each other, and lying at right angles to form a square aperture in the middle, which surrounds an upright post, B, being firmly secured thereto.

This post extends downward, and when the machine is ready for operation is buried in the ground, while the frame-work A A' rests flatly upon the surface of the ground.

C is a vertical pivot or shaft, extending upward from the post B.

D is a vertical drum or barrel, which revolves loosely upon the pivot C.

This drum carries the power-rope or chain $d$, which is wound thereon by means of a lever, E, to which power is applied by a horse or other animal driven in a circle about the machine.

A recess is cut in the top of the drum D, into which fits a hub, $e$, attached to the lever E.

F is a plate, attached to the top of the drum.

From the opposite sides of this plate extend, horizontally, arms or lugs, which receive pins $f$, by means of which the lever E is locked or secured from turning upon the drum, so that the revolution of the lever must carry the drum with it.

The rope or chain $d$ is connected to the grub to be pulled, and the power applied at the lever E.

The results obtained by this simple contrivance are surprising and almost beyond belief. Large black-oak grubs have been pulled, more than fifteen inches in diameter; in fact, trees that have hitherto ordinarily been felled by the ax, and then the stumps laboriously extracted by the ordinary stump-extractors.

In clearing land with my machine I pull such trees bodily out by the roots.

In using my grub-extractor I set it in a convenient place, first digging a hole for the reception of the post B, and then securing the frame A A' by stakes $a$ driven into the ground, to resist the turning of the frame.

I can then proceed to work upon all grubs and trees within a radius equal to the length of my rope $d$.

My invention is exceedingly simple and cheap, while at the same time it is of such a construction as to be very strong and durable, and may be used by a farmer for many purposes other than that of pulling grubs.

Having thus fully described my invention,

What I claim, and desire to secure by Letters Patent, is—

The frame-work A A', upright post B, carrying a vertical pivot C, the drum D revolving loose upon said pivot C, the rope $d$, and the lever E, all combined and arranged as specified and shown, and for the purpose set forth.

SAMUEL HARMAN.

Witnesses:
  ELIAS COMBS THOMAS.
  SEBASTIAN LAY.